May 7, 1929.   T. B. FUNK   1,712,263
SELF LUBRICATED BEARING
Filed March 23, 1925   2 Sheets-Sheet 1
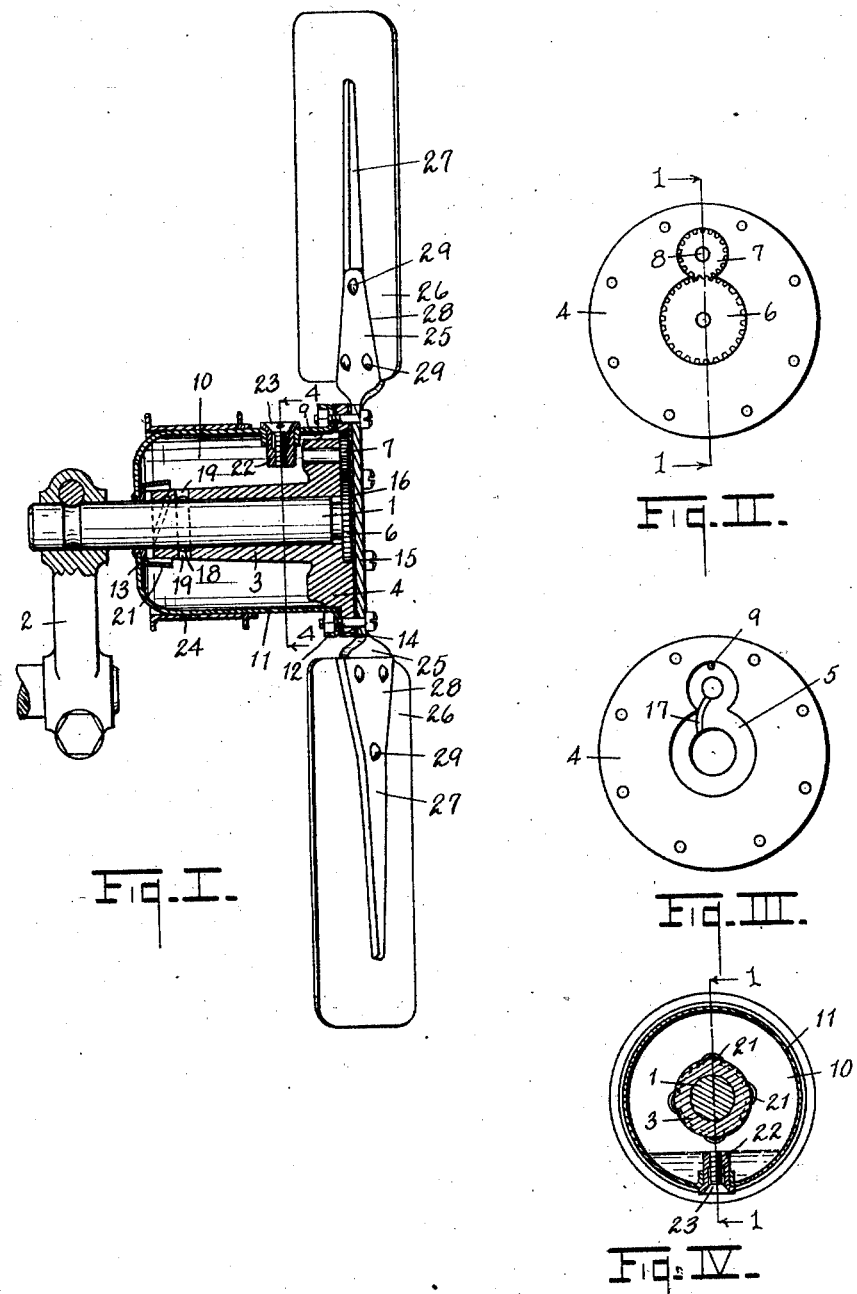
INVENTOR
Truman B. Funk
BY
Chappell & Earl
ATTORNEYS

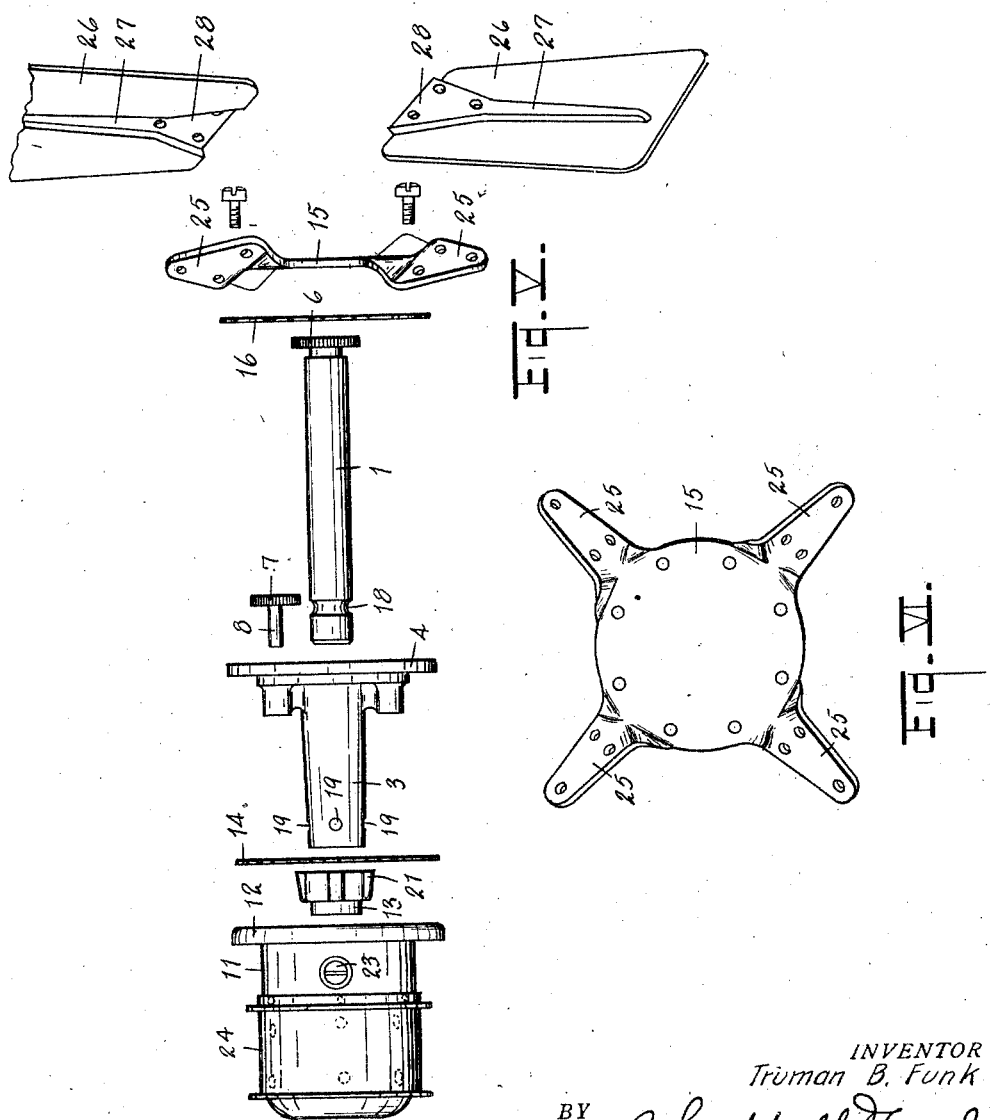

Patented May 7, 1929.

1,712,263

UNITED STATES PATENT OFFICE.

TRUMAN B. FUNK, OF JACKSON, MICHIGAN, ASSIGNOR TO AUTOMOTIVE FAN & BEARING COMPANY, OF JACKSON, MICHIGAN.

SELF-LUBRICATING BEARING.

Application filed March 23, 1925. Serial No. 17,509.

This invention relates to improvements in self-lubricated bearings.

The main object of this invention it to provide an improved self-lubricated bearing in which a supply of the lubricant is effectively retained and distributed to the bearing surfaces.

A further object is to provide an improved self-lubricated bearing which is well adapted for automobile engine cooling fans and the like which are normally driven at high speed.

Objects pertaining to details and economies of my invention will definitely appear from the detailed description to follow.

I accomplish the objects of my invention by the devices and means described in the following specification. The invention is clearly defined and pointed out in the claims.

A structure embodying the features of my invention is clearly illustrated in the accompanying drawing forming a part of this application, in which:

Fig. I is a fragmentary view of an automobile fan embodying the features of my invention partially in central longitudinal section on a line corresponding to line 1—1 of Figs. II and IV.

Fig. II is an end view of the bearing member with the gears of the gear pump in position therein.

Fig. III is an end view of the bearing member with the pump gears removed.

Fig. IV is a transverse section on a line corresponding to line 4—4 of Fig. I.

Fig. V is a view of the parts in disassembled relation, only two of the fan blades being illustrated and one of those being broken away.

Fig. VI is a side view of the fan web or spider.

In the drawing the sectional views are taken looking in the direction of the little arrows at the ends of the section lines and similar numerals of reference indicate similar parts in all of the views.

Referring to the drawing, the stub shaft 1 is carried by a bracket 2 or other suitable mounting. On this stub shaft is a bearing member 3 having a flange-like head 4 at its outer end. The outer side of this head 4 has a recess 5 therein adapted to receive the gear pump gears 6 and 7. The gear 6 is mounted upon the end of the shaft and is fixed thereon so that it constitutes a sun gear while the gear 7 is mounted on a spindle 8 carried by the bearing member head, the gear being rotated by its engagement with the fixed gear 6.

The pump chamber 5 is connected by the passage 9 with a lubricant chamber 10 formed or provided by the bearing member casing 11. This bearing member casing is cylindrical in form and has an out-turned flange 12 at its outer end bolted to the bearing member head, its inner end being drawn inwardly as illustrated and having an opening therein to receive the lubricant. A cup-like lubricant guard 13 embraces the inner end of the bearing member 3. A gasket 14 is arranged between the flange 12 and the bearing member head.

The plate-like fan spider 15 is also bolted to the bearing member head, a disk 16 of fiber or other suitable material being arranged on the inner side of this spider to constitute a gasket for the end plate. This gasket disk in the embodiment illustrated constitutes the outer wall of the gear pump housing.

A groove-like passage 17 at the rear wall of the recess 5 facilitates the flow of the lubricant from the pump to the shaft. The lubricant is forced by the pump into the bearing so that the bearing is entirely lubricated.

To prevent the forcing of the lubricant from the lubricant chamber around the shaft the bearing is provided adjacent its inner end with an internal lubricant collecting groove 18 and radial discharge openings 19 communicating with the groove. At the outer side of the groove 18 the bearing has an internal spiral groove which tends, when the bearing is rotated, to carry the lubricant toward the groove 18 thereby directing the lubricant from the end of the shaft toward the groove 18 to be discharged through the openings 19.

The cup-like inwardly flaring deflector 21 carried by the casing embraces the inner end of the bearing member so that any lubricant falling thereon is by centrifugal action carried inwardly and discharged therefrom. The casing 11 is provided with a filling tube 22 which projects radially into the lubricant chamber, this filling tube having a threaded closure plug 23. The purpose of this is twofold; first, to provide a gage to prevent an over-supply of lubricant. A supply of lubricant is introduced into the chamber, the structure is turned until the filling tube is in an upright position as shown in Fig. IV before the closure plug is inserted and any excess of lubricant will flow out. The level is determined as indicated in Fig. IV. The plug is then inserted.

In the structure illustrated the bearing casing is provided with a pulley 24 adapted to receive the driving belt. The fan spider has arms 25 which are given the proper twist to position the blades 26. These blades have outwardly tapered ribs 27 struck up therefrom providing strengthening means for the blades and also recesses 28 adapted to receive the arms 25 of the spider. Thus arranged, there is very little strain upon the blade attaching rivets 29 and the blades are rigid and strong even when made of comparatively light gage material.

I have illustrated and described my improvements in an embodiment which I have found very practical, the same being an adaptation of and in some respects an improvement over the lubricating features of my Patents No. 1,378,587 and No. 1,378,588, dated May 17, 1921 and the Funk and Eason Patent No. 1,370,422, dated March 1, 1921.

Having thus described my invention what I claim as new and desire to secure by Letters Patent is:

1. In a structure of the class described, the combination of a stub shaft, a bearing member rotatable on said shaft and having a flange-like head at its outer end, a bearing member casing mounted on said bearing member head and having an end wall with an opening therein to receive said shaft, the end of the said bearing member being adjacent to but spaced from said end wall, said bearing member having an internal annular groove adjacent the inner end thereof with radial discharge openings and a spiral internal groove at the outside of said annular groove, and a flaring lubricant guard mounted on said casing to embrace the inner end of the bearing member.

2. In a structure of the class described, the combination of a stub shaft, a bearing member rotatable on said shaft and having a flange-like head at its outer end, and a bearing member casing mounted on said bearing member head and having an end wall with an opening therein to receive said shaft, the end of the said bearing member being adjacent to but spaced from said end wall, said bearing member having an internal annular groove adjacent the inner end thereof with radial discharge openings and a spiral internal groove at the outside of said annular groove.

In witness whereof I have hereunto set my hand.

TRUMAN B. FUNK.